United States Patent
Lammerschop et al.

(10) Patent No.: US 7,462,658 B2
(45) Date of Patent: Dec. 9, 2008

(54) AGING-RESISTANT COATINGS AND ADHESIVE COMPOSITES

(75) Inventors: Olaf Lammerschop, Krefeld (DE); Steve Doering, Mettman (DE); Michael Kux, Monheim (DE); Andreas Ferencz, Duesseldorf (DE); Stefan Kreiling, Heuchelhelm (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 11/697,479

(22) Filed: Apr. 6, 2007

(65) Prior Publication Data

US 2007/0231582 A1 Oct. 4, 2007

Related U.S. Application Data

(63) Continuation of application No. PCT/EP2005/010884, filed on Oct. 10, 2005.

(30) Foreign Application Priority Data

Oct. 11, 2004 (DE) ........................ 10 2004 049 717

(51) Int. Cl.
 C08K 5/05 (2006.01)
 C08K 5/053 (2006.01)
 C08K 5/057 (2006.01)
 C08F 4/46 (2006.01)
 C08J 3/28 (2006.01)

(52) U.S. Cl. ..................... 523/456; 523/400; 523/461; 523/463; 522/170; 522/168; 522/30; 522/68; 522/69; 522/66; 428/411.1; 428/413; 528/86; 528/87; 528/93; 528/106

(58) Field of Classification Search ............... 522/170, 522/168, 30, 68, 69, 66; 523/456, 400, 463, 523/461; 428/411.1, 413; 528/86, 87, 93, 528/106

See application file for complete search history.

(56) References Cited

U.S. PATENT DOCUMENTS

| | | | |
|---|---|---|---|
| 3,339,633 A * | 9/1967 | Richardson | 166/295 |
| 3,806,486 A | 4/1974 | Endriss et al. | |
| 4,593,056 A * | 6/1986 | Qureshi et al. | 523/445 |
| 4,668,718 A * | 5/1987 | Schreiber | 523/451 |
| 5,001,212 A * | 3/1991 | Hammer et al. | 528/94 |
| 5,258,427 A * | 11/1993 | Stuart | 523/455 |
| 5,736,293 A * | 4/1998 | Hirai et al. | 430/203 |
| 6,562,482 B1 * | 5/2003 | Sakamoto | 428/620 |
| 6,653,371 B1 | 11/2003 | Burns et al. | |
| 6,887,950 B2 * | 5/2005 | Timberlake et al. | 525/485 |
| 7,202,311 B2 * | 4/2007 | Timberlake et al. | 525/480 |
| 2005/0129955 A1 | 6/2005 | Schoenfeld et al. | |

FOREIGN PATENT DOCUMENTS

| | | |
|---|---|---|
| EP | 0 458 521 A2 | 11/1991 |
| EP | 1 047 744 B1 | 10/2002 |
| EP | 1 074 571 B1 | 3/2005 |
| GB | 2 222 592 A | 3/1990 |
| JP | 01-245014 A2 | 9/1989 |
| JP | 08-198945 | 8/1996 |
| JP | 2003-105056 A2 | 4/2003 |
| JP | 2003-268206 A2 | 9/2003 |
| SU | 618390 A1 * | 6/1978 |
| WO | WO 00/34405 A1 | 6/2000 |
| WO | WO 03/014236 A2 | 2/2003 |

OTHER PUBLICATIONS

Patent Abstracts of Japan, JP 08198945 (1996).
A.M. Paguin, Hanbuch "Epoxidverbindungen und Epoxidharze", Springer-Verlag, Berlin, Chapter V, pp. 308-461 (1958).
Lee et al, "Handbook of Epoxy Resins", McGraw-Hill Book Company, Chapter 2, pp. 2-1-2-33 (1967).
Abstract for JP 2003268206 (2003).
Abstract for JP 2003105056 (2003).
Abstract for JP 01245014 (1989).
Din En 1465 (supercedes DIN 53 283) "Adhesives, Determination of tensile lap-shear strength of Rigid-to-rigid bonded assemblies", Beuth Verlag GmbH, Berlin, pp. 1-6 (Jan. 1995).

* cited by examiner

*Primary Examiner*—Sanza L McClendon
(74) *Attorney, Agent, or Firm*—Steven C. Bauman

(57) ABSTRACT

Curable compositions are provided which contain a curable component and particular m-hydroxybenzene derivatives, wherein such derivatives function as aging inhibitors. Such curable compositions are useful as coating agents and adhesives having improved aging resistance.

27 Claims, No Drawings

AGING-RESISTANT COATINGS AND ADHESIVE COMPOSITES

CROSS-REFERENCE TO RELATED APPLICATIONS

This application is a continuation under 35 USC Sections 365(c) and 120 of International Application No. PCT/EP2005/010884, filed 10 Oct. 2005 and published 20 Apr. 2006 as WO 2006/040108, which claims priority from German Application No. 102004049717.6, filed 11 Oct. 2004, each of which is incorporated herein by reference in its entirety.

FIELD OF THE INVENTION

The present invention relates to curable compositions which in the cured state, and particularly in a moist environment, are aging-resistant. The invention relates more particularly to coating materials and adhesives that comprise additives that impart aging resistance, and to the use of these additives in coating materials and adhesives.

DISCUSSION OF THE RELATED ART

The adhesion of a surface coating material to a substrate surface is of great importance for the durable functioning of the coating material. Exacting requirements in this respect are imposed in particular on adhesives intended for joining two substrates to one another with maximum durability. The bond strength of such an adhesive is dependent on the compatibility between adhesive and the substrate to which the adhesive is to be applied, i.e., on the adhesion between adhesive and substrate. In addition, however, the bond strength also rests on the cohesion of the adhesive itself. Even small changes in the composition of the adhesive may give rise to a drastic reduction in bond strength and hence either may make the adhesive completely unusable or may weaken, or even totally destroy, a bond produced using such an adhesive.

It is therefore necessary, right at the formulation stage of adhesives, to ensure that individual components supplied to such an adhesive do not adversely affect its bond strength. Furthermore, as a result of environmental influences and hence as a consequence of aging of the adhesive, an adhesive bond may suffer detraction from its bond strength over a certain period of time, to an extent such that it is no longer possible to ensure the firm bonding of two components.

The adhesion in particular of cured epoxy resins to metals, such as in the structural bonding of metals using epoxy resin adhesives, for example, falls considerably as a result of aging processes, particularly under the influence of moisture.

The particular cause is the migration of water into the adhesive bond, thereby lowering the adhesion of the adhesive to the metal surface.

In order to promote adhesion under humid conditions, metallic surfaces are pretreated, generally with what are called primers. This in turn necessitates a further workstep, which prolongs the work processes involved in adhesive bonding and gives rise to increased costs. In many cases, moreover, such as with accident repairs in the bodywork area, these pretreatment methods can only be used to a limited extent. This is particularly true of the steel or aluminum components frequently employed in bodywork construction, since the adhesion of two-part epoxy resin adhesives to steel or aluminum, particularly when substrate pretreatment is inadequate, is frequently very poor.

As a consequence of these aging processes, the adhesive may lose flexibility, cohesion or adhesion, or one or more other important properties.

Especially when an adhesive is to be used outdoors, it is necessary to ensure that changes, brought about for example by moisture, that lead to a loss in bond strength do not occur at all, or occur only to an unavoidably small extent.

This need has led to a variety of possibilities being proposed to give adhesive bonds improved long-term stability even under the influence of environmental conditions such as moisture.

Thus, for example, the prior art discloses thermosetting epoxy resin adhesives whose adhesion to aluminum surfaces under typical conditions is adequate. A disadvantageous consequence affecting these adhesives, however, is that for applications under extreme conditions the aging resistance is not adequate.

GB 2 222 592 A describes the pretreatment of metallic surfaces with polyhydroxylated benzene derivatives. In order to avoid this further workstep it is also recommended in some cases that the adhesive composition be admixed with additives. Accordingly, GB 2 222 592 A describes the coating of metallic surfaces with heat-curable one-part systems, i.e., systems which are self-curing on exposure to heat, without the addition of a further component, such as a chemical curing agent, and describes the curing of such systems at temperatures of at least 100° C., it being possible for the compositions to comprise polyhydroxylated benzene derivatives.

From EP 0 458 521 A2 it is known to use metal oxides in combination with polyhydroxyaryl compounds in heat-curable compositions in order to improve the aging resistance, with temperatures of at least 100° C. again being necessary for curing. EP 0 458 521 A2 delimits the metal oxides to be used according to claim 1 of EP 0 458 521 A2 from those oxides which have other functions, such as, for example, the thixotroping of the composition, or which serve as fillers. As metal oxides to be used, EP 0 458 521 comprehends oxides of the transition metals of the periodic table, particularly those of the copper and zinc subgroups. The use of such transition metal oxides, however, is undesirable for a variety of reasons, and more particularly for reasons of economics.

JP 08198945 (Abstract) discloses amine-curing epoxy resins that comprise aromatic hydroxy compounds and fillers.

WO 00/34405 A discloses adhesive compositions which comprise an aromatic carboxylic acid and a hydroxyl-containing polymer, the latter necessarily including a small fraction of carboxy-functional monomer units so that the adhesive composition possesses corrosion resistance.

WO 03/014236 A2 describes binder components which comprise compounds having chelating properties. The compounds disclosed that have chelating properties are in particular compounds which contain amino or mercapto groups.

BRIEF SUMMARY OF THE INVENTION

The object on which the invention was based was in particular that of increasing the aging resistance of adhesive assemblies even under extreme conditions, such as severe moisture, by providing adhesives which can be used without primers on numerous substrates, but in particular metals, and have excellent adhesion to the substrate and also excellent cohesion. A further intention is that it should be possible to dispense for example with the use of additive combinations with transition metal oxides, particularly those of the copper group and zinc group, and, furthermore, that use should be possible in two-part adhesive systems, i.e., in systems which typically cure even without heat.

Surprisingly it has been found that m-hydroxybenzene derivatives of the general formula (I):

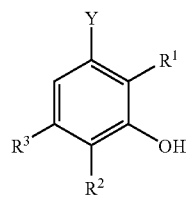
(I)

where Y is a carboxyl group, a carboxylate group or a straight-chain or branched alkyl group optionally substituted by hydroxyl groups, amino groups, carboxyl groups and/or carboxylate groups; and $R^1$, $R^2$, and $R^3$ independently of one another are identical or different and are hydrogen or a hydroxyl group, and $R^1$ and $R^3$ are not simultaneously a hydroxyl group; with the proviso that, where the curable component is a thermosetting component of a multicomponent, epoxy-based system, the curable composition is free from transition metal oxides of the copper group and zinc group and that, where the curable component is an epoxy-based thermosetting component, it is not a self-curing component, are outstandingly suitable for increasing the aging resistance of adhesive assemblies and coatings.

None of the documents known from the prior art even recognizes, let alone teaches, the significance of the 1-Y-3-hydroxy substitution pattern of the above compounds for the inventive utility.

DETAILED DESCRIPTION OF CERTAIN EMBODIMENTS OF THE INVENTION

Particularly preferred aging inhibitors are those in which one or two of the radicals $R^1$, $R^2$, and $R^3$ represent hydroxyl groups.

Examples of suitable aging inhibitors in which Y represents a carboxyl group or carboxylate group are, in particular, 3-hydroxybenzoic acid, 3-hydroxysalicylic acid, 3,5-dihydroxybenzoic acid, and 3,4,5-tri-hydroxybenzoic acid, and their salts. Suitable salts are in particular the alkali metal salts, such as sodium salts and potassium salts, or ammonium salts of the stated acids.

Examples of suitable aging inhibitors in which Y represents a straight-chain or branched alkyl group are, in particular, those in which the alkyl group contains 1 to 12, more preferably 1 to 6, and most preferably 1 to 4 carbon atoms. Especially preferred are the methyl, ethyl, n-propyl, isopropyl, n-butyl, isobutyl, and tert-butyl radicals. These may preferably be in further-substituted form and may preferably carry one or more of the following radicals selected from the group of hydroxyl, amino, carboxyl, and carboxylate. By way of example mention may be made of 3-ethylphenol, 5-(hydroxymethyl)benzene-1,3-diol, 4-isobutylbenzene-1,2-diol or 4-alanylbenzene-1,2-diol.

As well as the inventive use of the above-described aging inhibitors in curable compositions, such as adhesives or coating materials, for example, the curable compositions obtained accordingly are also provided by the invention.

Both in the case of the inventive use of the above-described aging inhibitors in curable compositions, such as adhesives or coating materials, for example, and in the curable compositions obtained accordingly, it is preferred for the compound of the general formula (I) to be in interaction with iron(III), and it is particularly preferred if the stated compound of the general formula (I) is present in the form of an iron(III) complex. The same applies to the process described as inventive in the context of the present specification.

In this context it may be stated that, wherever aging inhibitors of the general formula (I) are used within the present invention, it is particularly preferred for these inhibitors to be in interaction with iron(III), and it is particularly preferred if the stated compound of the general formula (I) is present in the form of an iron(III) complex.

In accordance with the invention, therefore, curable compositions comprising a curable component and at least one m-hydroxybenzene derivative of the general formula (1):

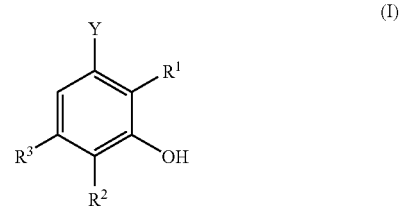
(I)

where Y is a carboxyl group, a carboxylate group or a straight-chain or branched alkyl group optionally substituted by hydroxyl groups, amino groups, carboxyl groups and/or carboxylate groups;

and $R^1$, $R^2$, and $R^3$ independently of one another are identical or different and are hydrogen or a hydroxyl group, and $R^1$ and $R^3$ are not simultaneously a hydroxyl group;

with the proviso that, where the curable component is a thermosetting component of a multicomponent, epoxy-based system, the curable composition is free from transition metal oxides of the copper group and zinc group and that, where the curable component is an epoxy-based thermosetting component, it is not a self-curing component, are provided by the invention.

It is regarded as being a preferred embodiment of the present invention for the compound of the general formula (I) to be in interaction with iron(III), and it is particularly preferred if the stated compound of the general formula (I) is present in the form of an iron(III) complex.

The curable component comprising in the compositions of the invention can be cured by radiation, heat, catalytically or a chemical curing agent and comprises, for example, epoxy compounds, (meth)acrylates (this term standing both for acrylates and for methacrylates), (meth)acrylic acid or polycuring polyisocyanates.

Among the systems known as multicomponent systems, in other words those which as well as one or more curable components comprise one or more curing agents, and which are mostly cold-curing, 2-part systems possess the greatest importance. In such 2-part systems the curable component is typically one which can be cured by means of a chemical curing agent.

Two-part epoxy adhesives may for example be amine-curing epoxy systems, the curing component being an epoxy component and the curing agent being an amine.

As the epoxy component in such systems it is usual to use polyepoxides having on average at least two epoxide groups per molecule. These epoxy compounds may be either saturated or unsaturated and also may be aliphatic, cycloaliphatic, aromatic or heterocyclic and may also contain hydroxyl groups.

These epoxy components are preferably polyglycidyl ethers based on polyhydric, preferably dihydric, alcohols, phenols, hydrogenation products of these phenols and/or novolaks (reaction products of mono- or polyhydric phenols with aldehydes, especially formaldehyde, in the presence of acidic catalysts).

Also suitable are the polyglycidyl ethers of polyhydric alcohols. As examples of such polyhydric alcohols mention may be made of ethylene glycol, diethylene glycol, triethylene glycol, 1,2-propylene glycol, polyoxypropylene glycols (n=1-20), 1,3-propylene glycol, 1,4-butylene glycol, 1,5-pentanediol, 1,6-hexanediol, 1,2,6-hexanetriol, glycerol, and 2,2-bis(4-hydroxycyclohexyl)propane.

It is also possible to use polyglycidyl ethers of polycarboxylic acids that are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid, and dimerized linolenic acid. Examples are diglycidyl adipate, diglycidyl phthalate, and diglycidyl hexahydrophthalate.

Particularly suitable epoxy compounds are those based on reaction products between epichlorohydrin and bisphenol A or bisphenol F.

A detailed listing of suitable epoxy compounds is found in A. M. Paquin, "Epoxidverbindungen und Epoxidharze" handbook, Springer-Verlag, Berlin 1958, chapter V, pages 308 to 461, and additionally in Lee, Neville "Handbook of Epoxy Resins", 1967, chapter 2, pages 2-1 to 2-33.

Used as amine curing agents in 2-part epoxy systems are primary and/or secondary amines. As amines it is preferred to use polyamines having at least two nitrogen atoms and at least two active amino hydrogen atoms per molecule. Aliphatic, aromatic, aliphatic-aromatic, cycloaliphatic, and heterocyclic diamines and polyamines can be utilized.

Examples of suitable amine curing agents are straight-chain or branched polyalkyleneamines, such as ethylenediamine, diethylenetriamine, triethylenetetramine, tetraethylenepentamine, 1,2-propylenediamine, 1,3-propylenediamine, 1,4-butanediamine, 1,5-pentanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis(3-aminopropyl)amine, N,N'-bis(3-aminopropyl)-1,2-ethanediamine, N-(3-aminopropyl)-1,2-ethanediamine, cycloaliphatic polyamines, such as 1,2-diaminocyclohexane, 1,3-diaminocyclohexane, 1,4-diaminocyclohexane, aminoethylpiperazine, poly(alkylene oxide)diamines, and triamines, such as Jeffamine® D-230, Jeffamine® D-400, Jeffamine® D D-2000, Jeffamine® D-4000, Jeffamine® T-403, Jeffamine® EDR-148, Jeffamine® D EDR-192, Jeffamine® C-346, Jeffamine® ED-600, Jeffamine® ED-900, and Jeffamine® ED-2001, aromatic polyamines such as meta-xylylenediamine, phenylenediamine, 4,4'-diaminodiphenylmethane, toluenediamine, isophoronediamine, 3,3'-dimethyl-4,4'-diaminodicyclohexylmethane, 4,4'-diaminodicyclohexylmethane, 2,4'-diaminodicyclohexylmethanre, the mixture of methylene-bridged poly(cyclohexyl-aromatic)amines (also known as MBPCAAs), and polyaminoamides.

Where the curing component is a (meth)acrylate or (meth) acrylic acid, curing is typically effected by free-radical polymerization, initiated by free-radical-forming substances, such as, for example, peroxides, hydroperoxides or azo compounds, and/or photochemically, induced by means of photoinitiators in combination with ultraviolet light.

Also possible, however, is ionic polymerization, especially anionic polymerization by means of suitable bases. In certain cases a polymerization may also take place simply by ingress of atmospheric moisture.

The aging inhibitors of the invention can also be used in polyurethane adhesive systems. Curing in this case takes place in particular by polycondensation of polyisocyanates, preferably diisocyanates, with polyols, especially diols.

Polyisocyanates are compounds having at least two isocyanate groups. Polyisocyanates used are preferably aromatic isocyanates, an example being diphenylmethane diisocyanate, either in the form of pure isomers, as an isomer mixture of the 2,4'-/4,4'-isomers, or else the diphenylmethane diisocyanate liquefied with carbodiimide (i.e., MDI), which is known for example under the trade name ISONATE 143 L. Additionally it is possible to use the so-called "crude MDI", i.e., the isomers/oligomers mixture of the MDI, as is obtainable, for example, under the trade name PAPI or DESMODUR VK. A further possibility is to use what are called quasi-prepolymers, i.e., reaction products of MDI or of tolylene diisocyanate (TDI) with low molecular mass diols such as ethylene glycol, diethylene glycol, propylene glycol, dipropylene glycol or triethylene glycol, for example. Although the aforementioned isocyanates are the particularly preferred isocyanates, it is also possible to use aliphatic or cycloaliphatic di- or polyisocyanates, such as, for example, hydrogenated MDI (H12MDI), tetramethylxylylene diisocyanate (TMXDI), 1-isocyanatomethyl-3-isocyanato -1,5,5-trimethylcyclohexane (IPDI), hexane 1,6-diisocyanate (HDI), biuretization product of HDI, isocyanuratization product of HDI or dimer fatty acid diisocyanate.

Polyols are compounds having at least two hydroxyl groups. Suitable polyols are preferably the liquid polyhydroxy compounds having two or three hydroxyl groups per molecule, such as, for example, di- and/or trifunctional polypropylene glycols in the molecular weight range from 200 to 6000, preferably in the range from 400 to 3000. It is also possible to use random and/or block copolymers of ethylene oxide and propylene oxide. A further group of polyether polyols which can be used with preference are the polytetramethylene glycols, prepared for example by the acidic polymerization of tetrahydrofuran, the molecular weight range of the polytetramethylene glycols being preferably between 200 and 6000, more preferably in the range from 400 to 4000. Additionally suitable as polyols are the liquid polyesters which can be prepared by condensing dicarboxylic and/or tricarboxylic acids, such as adipic acid, sebacic acid, glutaric acid, with low molecular mass diols and/or triols, such as ethylene glycol, propylene glycol, diethylene glycol, triethylene glycol, dipropylene glycol, 1,4-butanediol, 1,6-hexanediol, glycerol or trimethylolpropane. A further group of the polyols which can be employed are the polyesters based on lactones, such as caprolactone or valerolactone. It is possible, however, to use polyester polyols of oleochemical origin as well. This kind of polyester polyols can be prepared for example by complete ring opening of epoxidized triglycerides of a fatty mixture, comprising at least some olefinically unsaturated fatty acid, with one or more alcohols having 1 to 12 carbon atoms, followed by partial transesterification of the triglyceride derivatives to give alkyl ester polyols having 1 to 12 carbon atoms in the alkyl radical. Further suitable polyols are polycarbonate polyols and dimer diols, and also, in particular, castor oil and its derivatives. The hydroxy-functional polybutadienes as well, of the kind obtainable under the trade name "poly-BD", for example, can be used as polyols for the compositions of the invention.

Independently of the exemplary systems recited above, the aging inhibitors can be used in accordance with the invention independently of the adhesive system. As described, not only epoxy-based systems but also polyurethane or (meth)acrylate adhesive systems are particularly suitable.

Although employment in heat-curable 1-part and/or 2-part systems, i.e., adhesive systems with a curing temperature of 100° C. or more, is possible, a particular advantage of the aging inhibitors of the invention is in developing their activity in 2-part systems as well, at temperatures for example below 100° C., preferably at a temperature between 15° C. and 95° C., more preferably 50° C. to 90° C. In particular the epoxy-polyamine-based 2-part systems comprising aging inhibitors that can be employed in accordance with the invention exhibit an outstanding aging resistance.

Even small quantities of the additive, of less than 10% by weight, based on the curable composition, are typically sufficient to increase the aging resistance in accordance with the invention. In a given case, however, it may be that even very much lower quantities, of around 0.1% by weight, will be enough for the properties according to the invention to be developed. It is preferred to use 0.5% to 9% by weight, more preferably 2% to 8% by weight, most favorably 2% to 6% by weight, based on the curable composition.

The aging inhibitor can either be premixed with the curable component or, where a chemical curing component is needed for curing, can be supplied, by mixing the inhibitor with said curing component, to the curable composition of the invention. In 2-part systems, however, the aging inhibitor can also be present in both components or, where the processing time allows it, can be added to the 2-part system only after the two components have been mixed. The aging inhibitors can also be used in systems which comprise more than two components. For instance, they can be employed likewise in systems having two or more curable components and/or two or more curing agents.

The curable composition is preferably a coating material or an adhesive. A particular feature of the composition is that there is no need for transition metal oxides as a co-component for the aging inhibitor to be active in accordance with the invention.

The invention further provides a process which comprises the coating of the substrate with a curable composition, the curable composition comprising a curable component and at least one m-hydroxybenzene derivative of the general formula (I):

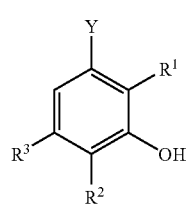
(I)

where Y is a carboxyl group, a carboxylate group or a straight-chain or branched alkyl group optionally substituted by hydroxyl groups, amino groups, carboxyl groups and/or carboxylate groups;

and $R^1$, $R^2$, and $R^3$ independently of one another are identical or different and are hydrogen or a hydroxyl group, and $R^1$ and $R^3$ are not simultaneously a hydroxyl group;

with the proviso that, where the curable component is a thermosetting component of a multicomponent, epoxy-based system, the curable composition is free from transition metal oxides of the copper group and zinc group and that, where the curable component is an epoxy-based thermosetting component, it is not a self-curing component.

The curable composition used in the process of the invention is preferably one which is curable by a chemical curing agent or via heat or radiation and is cured after application.

Where the process is used to produce adhesive assemblies, the curable composition preferably comprises a chemical curing agent and/or is curable by means of heat. In that case the coating present on the substrate, prior to its curing, is contacted with a further substrate such that the curable coating is between the two substrates and in a further step the coating is cured.

The substrates used in the process of the invention may in principle be any desired substrates, such as, for example, metallic substrates, plastics, glass and ceramic substrates or wood. The substrates employed are preferably metallic substrates such as, for example, light metals, aluminum, copper or steel such as, for example, ZE steel, ZEP steel or phosphated steel, it also being possible to employ metallic substrates in the form of their alloys or in galvanized or oil form.

The purpose of the examples which follow is to illustrate the invention.

EXAMPLES

Epoxy-Based Compositions

Cold Curing of an Epoxy-Based Composition

The epoxy adhesives were prepared using, as a curable binder component, an epoxy resin formed from bisphenol A and epichlorohydrin and having a number-average molar mass of approximately 700 g/mol (D.E.R. 331 P, available from The Dow Chemical Company) and, as the curing agent (or hardener), a terminally diamino-functional polypropylene glycol having a molar mass of 400 g/mol (Jeffamine® D400, available from Huntsman Chemical Company). The inventive composition further comprises 3,4,5-trihydroxybenzoic acid (see Example 2a) as an aging inhibitor. An adhesive thus prepared was used to bond cleaned and degreased ZE steel panels (or aluminum panels or CRS steel panels, respectively) with dimensions of 100×25 mm (bond area 25×10 mm), and the bonded panels were cured for 180 minutes at 90° C. or 80° C. The bonded panels were then investigated for the tensile shear strength of the bond (determined in accordance with DIN 53283, "Determination of the bond strength of adhesive bonds with a single overlap", at a speed of 100 mm/min). Further test specimens, produced identically, were subjected to a heat-and-humidity test at 70° C. and immediately following their withdrawal, in the moist state, were investigated for their tensile shear strength.

The heat-and-humidity test was carried out by wrapping the test specimens in a paper towel soaked with distilled water. This arrangement was then enclosed in aluminum foil and stored in an airtight plastic vessel at 70° C. for one week, two weeks or four weeks. After the corresponding storage time the samples were withdrawn, frozen at −20° C., thawed, and then immediately investigated at room temperature for their tensile shear strength.

As is apparent from Table 1, further inventive epoxy adhesives (Examples 2b and 2c) were provided, on the same binder and curing-agent basis already described above, the inventive composition comprising instead of the 3,4,5-trihydroxybenzoic acid (Example 2a), 3,4-dihydroxyphenylalanine (Example 2b) or 3,4-dihydroxyphenylalanine plus Fe(III) (Example 2c) as the aging inhibitor.

The adhesives prepared in accordance with Examples 2b and 2c were used to bond cleaned and degreased CRS steel panels with dimensions of 100×25 mm (bond area 25×10 mm) which were cured at 90° C. for 180 minutes. The investigation of the adhesively bonded panels in terms of the tensile shear strength of the bond took place as already described (DIN 53282, "Determination of the bond strength of adhesive bonds with a single overlap" at a speed of 100 mm/min). The results of this are given in Table 4. For Examples 2b and 2c, additional, identically produced test specimens were subjected to a heat-and-humidity test at 70° C. and immediately after their withdrawal, in the moist state, were investigated for their tensile shear strength. The results of this are also given in Table 4.

The heat-and-humidity test was carried out likewise as already described above.

To prepare the aging inhibitor used in Example 2c [3,4-dihydroxyphenylalanine plus Fe(III)], 0.035 mol of 3,4-dihydroxyphenylalanine was introduced at RT in 100 ml of ethanol. Then approximately 50 ml of an ethanolic solution of 0.038 mol of Fe(III) nitrate were added with stirring. After about 15 minutes a strongly colored precipitate is formed. After a further 15 minutes this precipitate is isolated by filtration, washed with ethanol and then dried in a drying cabinet.

The activity of the adhesives of the invention was examined by preparing the adhesives indicated in the table below.

TABLE 1

|   | D.E.R. ® 331 P [% by wt.] | Jeffamine ® D400 [% by wt.] | 3,4,5-Trihydroxy-benzoic acid [% by wt.] | 3,4-Dihydroxy-phenyl-alanine [% by wt.] | 3,4-Dihydroxy-phenyl-alanine plus Fe(III) [% by wt.] |
|---|---|---|---|---|---|
| Example 1* | 62.2 | 37.8 | — | — | — |
| Example 2a | 59.1 | 35.9 | 5.00 | — | — |
| Example 2b | 59.1 | 35.9 | — | 5.00 | — |
| Example 2c | 59.1 | 35.9 | — | — | 5.00 |

*Example 1 is not inventive

TABLE 2

Tensile shear strength (in MPa) for adhesive assemblies with ZE steel after heat-and-humidity (H&H) treatment

|  | Example 1 | Example 2a (inventive) | |
|---|---|---|---|
|  | Curing at 90° C. | Curing at 90° C. | Curing at 80° C. |
| 0 days H&H | 18.8 | 22.8 | 19.8 |
| 7 days H&H | 6.6 | 21.1 | 19.9 |
| 14 days H&H | 5.8 | 21.6 | 18.1 |
| 28 days H&H | 2.8 | 21.1 | 19.4 |

TABLE 3

Tensile shear strength (in MPa) for adhesive assemblies with aluminum after heat-and-humidity (H&H) treatment

|  | Example 1 | Example 2a (inventive) | |
|---|---|---|---|
|  | Curing at 90° C. | Curing at 90° C. | Curing at 80° C. |
| 0 days H&H | 14.2 | 13.7 | 11.7 |
| 7 days H&H | 5.4 | 12.6 | 10.0 |
| 14 days H&H | 4.4 | 11.1 | 8.9 |
| 28 days H&H | 4.1 | 12.0 | 8.2 |

TABLE 4

Tensile shear strength (in MPa) for adhesive assemblies with CRS steel after heat-and-humidity (H&H) treatment

|  | Example 1 | Example 2a (inventive) | | Example 2b (inventive) | Example 2c (inventive) |
|---|---|---|---|---|---|
|  | Curing at 90° C. | Curing at 90° C. | Curing at 80° C. | Curing at 90° C. | Curing at 90° C. |
| 0 days H&H | 17.1 | 22.8 | 16.8 | 24.2 | 24.2 |
| 7 days H&H | 3.7 | 22.2 | 18.1 | 15.7 | 16.3 |
| 14 days H&H | 2.1 | 21.2 | 17.1 | 13.3 | 16.7 |
| 28 days H&H | 2.1 | 20.8 | 18.4 | 12.1 | 15.2 |

Heat Curing of a 2-Part, Epoxy-Based Composition at 120° C. Without Addition of Transition Metal Oxides of the Copper Group and Zinc Group For the purpose of carrying out the experiments from Tables 5 and 6, compositions corresponding to Table 1 were prepared, but with different inventive and noninventive additives, and were applied to a degreased aluminum test element A16016 (100×25×0.8 mm), cured at 120° C. for 1 hour and stored in some cases under hot and humid conditions. Table 5 shows the use of inventive additives, while Table 6 shows the use of noninventive additives.

facturer: Henkel KGaA) and, as curing agent, the isocyanate MACROPLAST UK 5400 (density: 1.22±0.05 g/cm³; viscosity (Brookfield RVT, 20° C.): 250±100 mPas; manufac-

TABLE 5

Inventive additives (5% by weight)

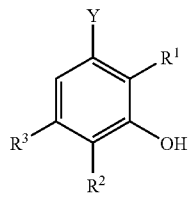

Tensile shear strength after aging under H&H conditions [MPa]

| H&H (days) | Example 3<br>Y = COOH<br>$R^1 = R^2 = R^3 =$ H | Example 4<br>Y = COOH<br>$R^1 = H$<br>$R^2 = R^3 = OH$ | Example 5<br>Y = COOH<br>$R^2 = R^3 = H$<br>$R^1 = OH$ | Example 6<br>Y = COOH<br>$R^1 = R^2 = H$<br>$R^3 = OH$ | Example 7<br>Y = CH$_2$CH(NH$_2$)(COOH)<br>$R^1 = R^3 = H$<br>$R^2 = OH$ |
|---|---|---|---|---|---|
| 0 | 13.6 | 14.6 | 14.9 | 14.6 | 16.4 |
| 7 | 13.1 | 12.1 | 13.4 | 12.5 | 13.5 |
| 14 | 12.6 | 12.2 | 12.2 | 11.6 | 12.7 |
| 28 | 12.3 | 12.4 | 10.7 | 11.3 | 11.2 |

Even after 28-day aging under hot and humid conditions, the tensile shear strengths of the adhesives prepared using the inventive additives are barely below their starting values (Table 5). In contrast to this, the values of the tensile shear strengths for the use of noninventive additives is lower already after 7-day aging under hot and humid conditions than those when using inventive additives after 28-day aging (compare Table 5 and Table 6).

turer: Henkel KGaA). The inventive composition further comprises 3,4,5-trihydroxybenzoic acid as aging inhibitor. An adhesive prepared in this way was used to bond aluminum panels with dimensions of 100×25 mm (bond area 25×10 mm) which had been given a chromium-free pretreatment. The resulting test specimens were stored at 20° C. for 14 days. The bonded panels were subsequently investigated for the tensile shear strength of the bond (determined in accordance

TABLE 6

Noninventive additives (5% by weight)

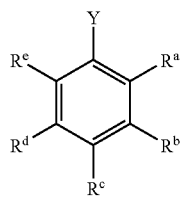

Tensile shear strength after aging under H&H conditions [MPa]

| H&H (days) | Example 8<br>no additive | Example 9<br>Y = COOH<br>$R^a = R^b = R^c =$<br>$R^d = R^e =$ H | Example 10<br>Y = COOH<br>$R^a = OH$<br>$R^b = R^c = R^d =$<br>$R^e = H$ | Example 11<br>Y = COOH<br>$R^c = OH$<br>$R^a = R^b =$<br>$R^d = R^e = H$ | Example 12<br>Y = COOH<br>$R^a = R^c = OH$<br>$R^b = R^d = R^e =$<br>H | Example 13<br>Y = COOH<br>$R^a = R^c = R^e =$<br>OH<br>$R^b = R^d = H$ | Example 14<br>Y = H<br>$R^a = R^c =$<br>$R^e = OH$<br>$R^b = R^d = H$ |
|---|---|---|---|---|---|---|---|
| 0 | 15.4 | 13.1 | 13.5 | 13.8 | 14.5 | 13.7 | 12.7 |
| 7 | 8.9 | 8.7 | 11.4 | 9.2 | 10.9 | 8.6 | 8.6 |
| 14 | 9.2 | 6.8 | 9.4 | 8.5 | 8.9 | 8.3 | 5.8 |
| 28 | 8.7 | 7.2 | 9.1 | 8.1 | 8.1 | 9.8 | 4.1 |

Polyurethane-Based Compositions

The PU adhesives were prepared using, as the curable binder component, a hydroxyl-containing organic compound MACROPLAST UK 8202 (density: 1.45 ±0.05 g/cm³; viscosity (Brookfield RVT, 20° C.): 27 000 ±4000 mPas; manuwith DIN 53283, "Determination of the bond strength of adhesive bonds with a single overlap", at a speed of 100 mm/min). Further test specimens, prepared identically, were subjected to a heat-and-humidity test at 70° C. and immediately after being withdrawn, in the humid state, were investigated for their tensile shear strength.

TABLE 7

|  | MACROPLAST UK 8202 | MACROPLAST UK 5400 | 3,4,5-Trihydroxybenzoic acid |
|---|---|---|---|
| Example 15 | 80.0% by weight | 20.0% by weight | — |
| Example 16 | 71.5% by weight | 25.0% by weight | 3.5% by weight |

*Example 15 is not inventive

MACROPLAST UK 8202, MACROPLAST UK 5400, and 3,4,5-trihydroxybenzoic acid were combined at 20° C. The additional amount of curing agent used as compared with Example 3 was calculated such that the benzene derivative employed, on the basis of its hydroxyl number, was compensated by an equivalent amount of curing agent, on the basis of its NCO number.

TABLE 8

Tensile shear strength (in MPa) for PU adhesive assemblies with aluminum after heat-and-humidity (H&H) treatment

|  | Example 15 | Example 16 (inventive) |
|---|---|---|
| 0 days H&H | 13.0 | 13.0 |
| 7 days H&H | 1.3 | 13.4 |
| 14 days H&H | 0.5 | 7.8 |
| 28 days H&H | 0.8 | 2.6 |

What is claimed is:

1. A curable composition comprising a curable component and at least one m-hydroxybenzene derivative of the general formula (I):

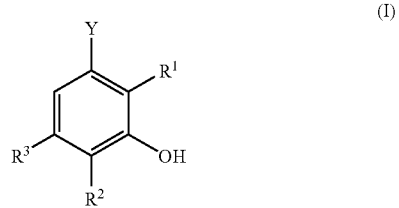

where Y is a carboxyl group, a carboxylate group or a straight-chain or branched alkyl group optionally substituted by hydroxyl groups, amino groups, carboxyl groups and/or carboxylate groups;
and $R^1$, $R^2$, and $R^3$ independently of one another are identical or different and are hydrogen or a hydroxyl group, and $R^1$ and $R^3$ are not simultaneously a hydroxyl group;
wherein the m-hydroxybenzene derivative of the general formula (I) is in interaction with iron(III);
with the provisos that, where the curable component is a thermosetting component of a multicomponent, epoxy-based system, the curable composition is free from transition metal oxides of the copper group and zinc group and that, where the curable component is an epoxy-based thermosetting component, the curable component is not a self-curing component.

2. The curable composition of claim 1, wherein said curable composition is curable by radiation, heat, catalytically or a chemical curing agent.

3. The curable composition of claim 1, wherein the curable composition is cured by a chemical curing agent which reacts with the curable component to cure the curable composition.

4. The curable composition of claim 1, wherein the curable component is selected from the group consisting of epoxy compounds, (meth)acrylic acid and esters thereof, and polyols.

5. The curable composition of claim 1, wherein the curable component is an amine-curing epoxy compound or a polyisocyanate-curing polyol.

6. The curable composition of claim 1, wherein the curable component is a bisphenol A-epichlorohydrin adduct.

7. The curable composition of claim 1, wherein a polyamine having at least two nitrogen atoms and at least two active amino hydrogen atoms per molecule is used as a curing agent.

8. The curable composition of claim 1, wherein one or two of the radicals $R^1$, $R^2$ or $R^3$ are hydroxyl groups.

9. The curable composition of claim 1, wherein the compound of the general formula (I) is present in an amount of less than 10% by weight based on the total curable composition.

10. The curable composition of claim 1, wherein the compound of the general formula (I) is present in an amount of 0.5% to 9% by weight, based on the total curable composition.

11. The curable composition of claim 1, wherein the compound of the general formula (I) is present in an amount of 2% to 6% by weight, based on the total curable composition.

12. The curable composition of claim 1, wherein the m-hydroxybenzene derivative of the general formula (I) is present in the form of an iron(III) complex.

13. The curable composition of claim 1, wherein the curable composition is a coating composition or an adhesive.

14. The curable composition of claim 1, wherein the curable composition is cold-curable.

15. The curable composition of claim 1, wherein the curable composition is curable at temperatures below 100° C.

16. The curable composition of claim 1, wherein the curable composition is curable at a temperature between 15° C. and 95° C.

17. The curable composition of claim 1, wherein the curable composition is curable below 100° C. and comprises an epoxy compound as curable component and an amine having at least two amino groups as curing agent.

18. The curable composition of claim 1, wherein Y is a carboxyl group.

19. The curable composition of claim 1, wherein said m-hydroxybenzene derivative is selected from the group consisting of iron (III) complexes of 3-hydroxybenzoic acid, 3,4,5-trihydroxybenzoic acid, 3-hydroxysalicylic acid, 3,5-dihydroxybenzoic acid, and mixtures thereof.

20. A process comprising coating a substrate with a curable composition, wherein the curable composition comprises a curable component and at least one m-hydroxybenzene derivative of the general formula (I):

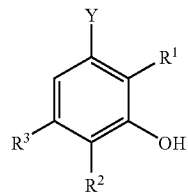

(I)

where Y is a carboxyl group, a carboxylate group or a straight-chain or branched alkyl group optionally substituted by hydroxyl groups, amino groups, carboxyl groups and/or carboxylate groups;

and $R^1$, $R^2$, and $R^3$ independently of one another are identical or different and are hydrogen or a hydroxyl group, and $R^1$ and $R^3$ are not simultaneously a hydroxyl group;

wherein the m-hydroxybenzene derivative of the general formula (I) is in interaction With iron (III);

with the proviso that, where the curable component is a thermosetting component of a multicomponent, epoxy-based system, the curable composition is free from transition metal oxides of the copper group and zinc group and that, where the curable component is an epoxy-based thermosetting component, the curable component is not a self-curing component.

21. The process of claim 20, wherein the curable composition comprises a curing agent or is heat- or radiation-curable and is cured.

22. The process of claim 20, wherein the curable composition comprises a curing agent or is heat-curable and is contacted with a further substrate such that the curable composition coated on the substrate is situated between the substrate and the further substrate and is cured in a further step.

23. The process of claim 20, wherein the substrate is a metallic substrate.

24. The process of claim 20, wherein the substrate is a metallic substrate selected from the group consisting of aluminum, steel, copper, or alloys thereof.

25. The process of claim 20, wherein the m-hydroxybenzene derivative of the general formula (I) is present in the form of an iron(III) complex.

26. An assembly comprising a first substrate, a second substrate, and a layer of the curable composition of claim 1 between said first substrate and said second substrate.

27. A coated substrate comprising a substrate and the curable composition of claim 1 coated thereon.

* * * * *